US008859637B2

(12) United States Patent
Carlson et al.

(10) Patent No.: US 8,859,637 B2
(45) Date of Patent: Oct. 14, 2014

(54) HYDROPHILIC AGENTS IN PAINTS

(71) Applicant: Empire Technology Development LLC, Wilmington, DE (US)

(72) Inventors: William Brenden Carlson, Seattle, WA (US); Angele Sjong, Louisville, CO (US); Georgius Abidal Adam, Edensor Park (AU); Feng Wan, Issaquah, WA (US); Timothy Londergan, Seattle, WA (US)

(73) Assignee: Empire Technology Development LLC, Wilmington, DE (US)

( * ) Notice: Subject to any disclaimer, the term of this patent is extended or adjusted under 35 U.S.C. 154(b) by 18 days.

(21) Appl. No.: 13/877,413

(22) PCT Filed: Oct. 22, 2012

(86) PCT No.: PCT/US2012/061263
§ 371 (c)(1),
(2), (4) Date: Apr. 2, 2013

(87) PCT Pub. No.: WO2014/065776
PCT Pub. Date: May 1, 2014

(65) Prior Publication Data
US 2014/0121296 A1  May 1, 2014

(51) Int. Cl.
C09K 3/18 (2006.01)
(52) U.S. Cl.
CPC ...................................... C09K 3/18 (2013.01)
USPC .......................................................... 523/122
(58) Field of Classification Search
USPC .......................................................... 523/122
See application file for complete search history.

(56) References Cited

U.S. PATENT DOCUMENTS

| | | |
|---|---|---|
| 2003/0195274 A1 | 10/2003 | Nakamura et al. |
| 2004/0109880 A1* | 6/2004 | Pauly et al. ................ 424/401 |
| 2006/0177810 A1 | 8/2006 | Tsuda et al. |
| 2011/0039066 A1 | 2/2011 | Bauer et al. |
| 2011/0224131 A1 | 9/2011 | McDaniel |

FOREIGN PATENT DOCUMENTS

WO  WO 98/15620 A1  4/1998

OTHER PUBLICATIONS

International Search Report and Written Opinion for PCT/US2012/061263 dated Jan. 23, 2013.
Antifreeze Protein, http://en.wikipedia.org/wiki/Antifreeize_protein, (Printed from Internet Feb. 14, 2013).
Battaglia et al., The Enigmatic LEA Proteins and Other Hydrophilins, *Plant Physiology* (Sep. 2008), 148:6-24.
Dang et al., Identification of two hydrophilins that contribute to the desiccation and freezing tolerance of yeast (*Saccharomyces cerevisiae*) cells, *Cryobiology* (Jun. 2011), 62(3):188-193 (Abstract).
Griffith et al., Antifreeze proteins in overwintering plants: a tale of two activities, *Trends in Plant Science* (Aug. 2004), 9(8):399-405.
Grunwald et al., Mimicking biopolymers on a molecular scale: nano(bio)technology based on engineered proteins, *Phil. Trans. R. Soc. A* (2009), 367:1727-1747.
Guozhang et al., Isolation and expression pattern of *COR15b* and *KIN1* genes in watermelon and pumpkin, *African Journal of Biotechnology* (Nov. 2, 2009), 8(21):5666-5672.
Hara et al., Metal binding by citrus dehydrin with histidine-rich domains, *Journal of Experimental Botany* (Aug. 30, 2005), 56(420):2695-3703.
Huang et al., Experimental study on frost release and fin-and-tube heat exchangers by use of novel anti-frosting paint, *Experimental Thermal and Fluid Science* (Oct. 2009), 33(7);1049-1054 (Abstract).
Kosova et al., The role of dehydrins in plant response to cold, *Biologia Plantarum* (2007), 51(4):601-617.
Liu et al., Experimental investigations of frost release by hydrophilic surfaces, *Frontiers of Energy and Power Engineering in China* (Dec. 2010), 4(4):475-487 (Abstract).
Middelton et al., Identification of the ice-binding face of a plant antifreeze protein, *FEBS Letters* (Feb. 18, 2009), 583(4):815-819 (Abstract).
Walters Jr. et al., A nonprotein thermal hysteresis-producing xylomannan antifreeze in the freeze-tolerant Alaskan beetle *Upis ceramboides*, *PNAS* (Dec. 1, 2009), 106(48):20210-20215.
Wisniewski et al., Purification, immunolocalization, cryoprotective, and antifreeze activity of PCA60: A dehydrin from peach (*Prunus persica*), *Physiol. Plant* (1999), 105:600-608.
Zhang et al., Significance of conservative asparagine residues in the thermal hysteresis activity of carrot antifreeze protein, *Biochem. J.* (2004), 377:589-595.

* cited by examiner

*Primary Examiner* — Nathan M Nutter
(74) *Attorney, Agent, or Firm* — Pepper Hamilton LLP

(57) ABSTRACT

Coating compositions that provide hydrophilic and antifreeze properties are disclosed. The coatings include at least one hydrophilic agent bound to one or more coating components, such as a rheology modifier, a surfactant, a coalescing agent, and a pigment. The hydrophilic agents are attached to the coating components covalently.

23 Claims, 1 Drawing Sheet

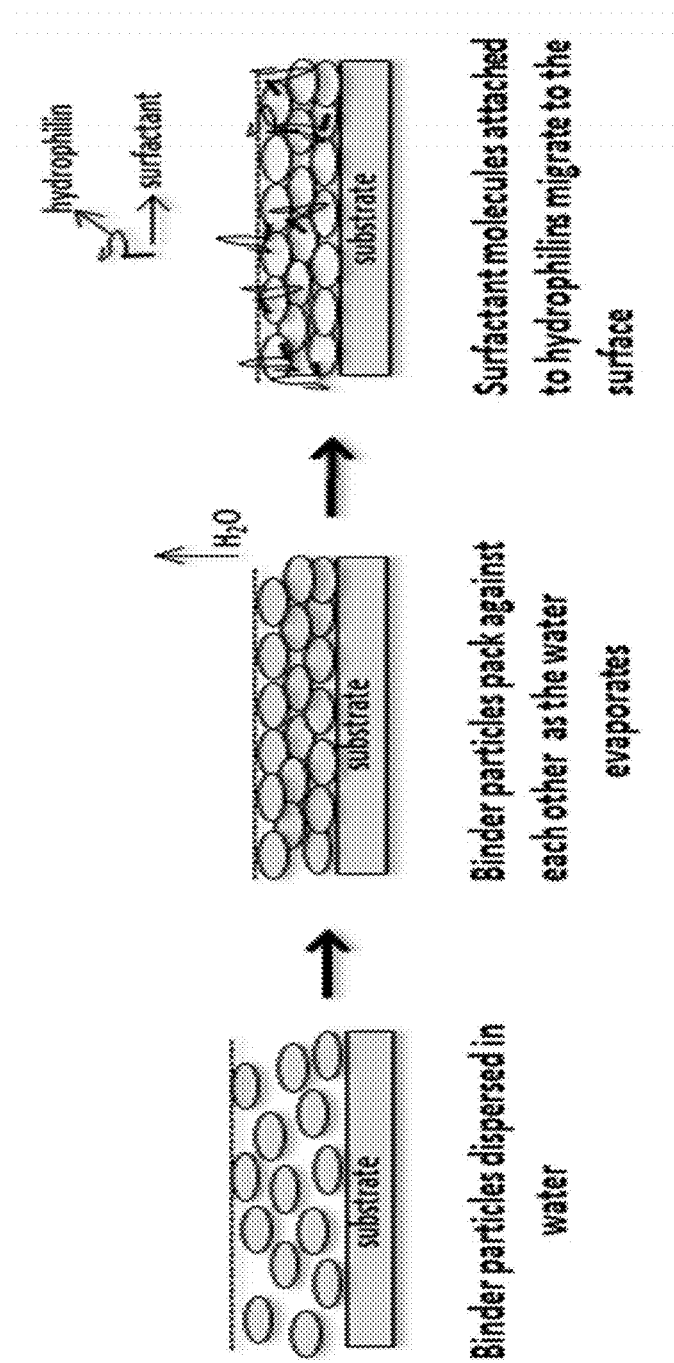

HYDROPHILIC AGENTS IN PAINTS

CLAIM OF PRIORITY

This application is a U.S. national stage filing under 35 U.S.C. §371 of International Application No. PCT/US2012/061263 filed Oct. 22, 2012 entitled "Hydrophilic Agents in Paints," which is incorporated herein by reference in its entirety.

BACKGROUND

Coatings and paints are routinely used to beautify and protect substrates. The most simple coatings and paints are made of a polymer (the binder) in a solvent (the vehicle), which is commonly called a lacquer. Paints and coatings modify the appearance of an object by adding color, gloss, or texture, and by blending with or differentiating from a surrounding environment. For example, a surface that is highly light scattering (i.e. a flat surface) can be made glossy by the application of a paint that has a high gloss. Conversely, a glossy surface can be made to appear flat. Thus, the painted surface is hidden, altered, and ultimately changed in some manner by the presence of the coating. In addition, paints also protect the surface from the surrounding elements and prevent or reduce the corrosive process.

Although paints and coatings alter the appearance of the surface, the coating itself can get dirty. The dirt can dull the coating by increasing the light scattering or modifying the color. Many attempts to create organic coatings that resist dirt and contamination have been undertaken. In one case, hydrophobic coatings with a low surface energy that resist water and, thus, are resistant to dirt have been created. For example, highly fluorinated polymers related to Teflon have been used for this purpose. These coatings often have a surface energy of no more than 15 dynes, which results in water forming beads on the surface rather than wetting the surface. Generally, these coatings take more time to become contaminated and maintain the appearance of the object longer, but they still eventually need to be cleaned. Thus, it is desirable to have coatings with hydrophilic surface with self-cleaning properties.

Low temperatures, in some cases, may affect the durability of paints due to frost. Frost formation occurs when water vapor in the surrounding air comes into contact with cold surfaces through heat and mass transfer. Frost is undesirable as repeated freeze-thawing cycles may easily damage the organic binder present in the coating. A few studies have shown that changing the surface energy of the coatings, such as increasing the surface hydrophilicity or hydrophobicity, has significant effects on the frost deposition process, particularly in the first frost cycle. Accordingly, there is a need to develop coatings with hydrophilic and anti-freeze properties.

SUMMARY

Presently provided are coatings with hydrophilic and anti-freeze properties. In one embodiment, a coating composition may include at least one hydrophilic agent bound to one or more coating components, such as a rheology modifier, a surfactant, a coalescing agent, and a pigment. The coating may further include a binder component.

In an another embodiment, a method of providing a hydrophilic, self-cleaning surface to a substrate under low humidity conditions may involve applying a paint composition to the substrate, wherein the paint composition comprises at least one hydrophilic agent bound to one or more of the following coating components: a rheology modifier, a surfactant, a coalescing agent, or a pigment.

In an additional embodiment, a method of providing ice-repellent properties to a substrate surface may involve applying a paint composition to the substrate, wherein the paint composition comprises at least one hydrophilic agent bound to one or more of the following coating components: a rheology modifier, a surfactant, a coalescing agent, or a pigment.

In a further embodiment, a method of preparing a hydrophilic paint composition may involve contacting at least one hydrophilic agent with a surfactant to form a mixture, purifying the mixture, and adding the mixture to a paint to form the hydrophilic paint composition.

DETAILED DESCRIPTION

Figure 1:
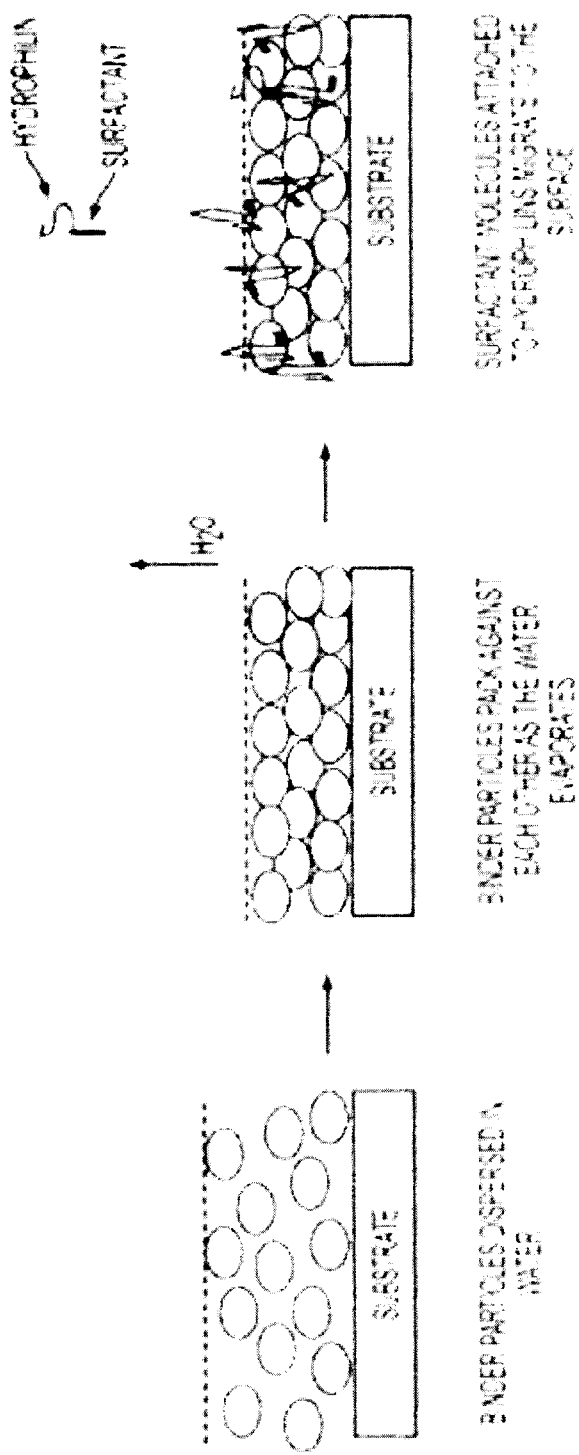
FIG. 1 illustrates a coating with a hydrophilic agent attached to a surfactant applied on a surface according to an embodiment.

This disclosure is not limited to the particular systems, devices and methods described, as these may vary. The terminology used in the description is for the purpose of describing the particular versions or embodiments only, and is not intended to limit the scope.

As paints and coatings become covered and contaminated with unwanted substances, the appearance of the object often changes in undesirable ways. It is often expensive to clean the coated surface, and the detergents, surfactants, fragrances, alkali, lime, and/or other chemicals used to clean the surface make their way into the environment where they can potentially cause great damage. Thus, it is desirable to have a coating with hydrophilic surface that keeps dirt from sticking to the surface, is self-cleaning, and contains environmental friendly chemicals.

"Frost" as used herein refers to depositions of minute ice crystals on a surface formed by condensation of water at temperatures below freezing. As ice crystals form on a painted surface, they progressively increase the latex particle concentration in the unfrozen water. Eventually, latex particles are forced into contact with each other at the pressure of growing ice crystal structures resulting in particle aggregation or inter-particle coalescence. This leads to appearance of an uneven painted surface, and repeated freeze-thawing cycles may cause chalking or peeling at those places. The present disclosure provides the use of hydrophilic agents in paints that have both hydrophilic and/or anti-freeze properties.

Anti-freeze proteins (AFPs) are a family of peptides naturally found in fish and plants inhabiting extremely cold climates, and are believed to protect them from freezing temperatures. However, the mechanism of action of AFP is still largely unknown. When water begins to freeze and form ice crystals, some crystals tend to dominate over others by growing in size and attracting water molecules from adjacent crystals. AFPs tend to counteract this recrystallization and ice nucleation process and slow the growth of ice crystals. Further, aqueous solutions containing AFP possess many unusual freezing properties. For example, AFP lowers the freezing point of a solution in a non-colligative manner with little or no effect on the melting point, called thermal hysteresis. So, an AFP solution may have a freezing point of $-2°$ C., but a melting point of $-1°$ C. This is in contrast to salt solutions that typically depress the freezing point and melting point equally. Thus, AFPs lowers the temperature at which an ice crystal can grow, and it is believed that this property of AFP is important in protecting the organism from the physical damage caused by ice crystals.

AFPs bind irreversibly to ice crystal lattice and currently no known consensus sequence or ice-binding domain has been identified. It is believed that plant AFPs and fish AFPs interact with ice crystals with different mechanisms. Ice-binding domains of fish AFPs are flat and relatively hydrophobic, and their adsorption onto ice is a hydrophobic interaction driven by the increase in entropy gained by releasing hydration water from the ice and protein surfaces. In contrast, plant AFPs interact with ice crystals through multiple hydrophilic ice-binding domains. Recently, a non-protein substance with anti-freeze properties was discovered in the Alaskan beetle, UpisCeramboides. Compositional analysis revealed a complex of saccharide and lipid (beta-mannopyranosyl- beta-xylopyranose backbone and a fatty acid component), and it is probable that the lipid may not be covalently linked to the saccharide.

Hydrophilins, also called late embryogenesis abundant (LEA) proteins, are widely perceived to participate in the dehydration process that occurs during the late stages of seed maturation, by assisting the acclimatization of seed tissues to the lower water content found in mature seeds. These hydrophilic proteins accumulate under dehydration conditions in seeds and vegetative organs, thus protecting them from the adverse conditions. It has been shown that ectopic expression of hydrophilins in plants and yeast confers tolerance to water-deficit conditions. The physio-chemical characteristics that define this set of proteins are the presence of glycine content greater than 6% and a hydrophilicity index greater than 1. Members of the LEA protein families appear to be ubiquitous in the plant kingdom. Their presence has been confirmed not only in angiosperms and gymnosperms, but also in seedless vascular plants, bryophytes, pteridophytes and algae. It is believed that as the protein approaches dehydration conditions, the residues re-orient themselves so that the hydrophilic residues are placed on the exterior surface of the protein.

Hydrophilins are divided into six groups based on their similarities in their amino acid sequences. Group III family of hydrophilin proteins are also called dehydrins. A key element of the dehydrins is the presence of one or more 15 amino acid, lysine rich stretches called the "K motifs," which are predicted to form class A amphipathic alpha-helices. It is proposed that these amphipathic K motifs of dehydrin polypeptides functionally interact with the solvent-exposed hydrophobic patches of cellular proteins that are undergoing partial denaturation, and thereby block protein aggregate formation. In addition, these drought-resistant proteins tightly bind and organize water molecules around them, thus reducing water loss from cells under desiccation conditions. Thus, hydrophilins and AFPs are attractive hydrophilic agents that may be used in paints and coatings.

In the present disclosure, the coatings may contain at least one hydrophilic agent bound to one or more of the following coating components or additives: a rheology modifier, a surfactant, a coalescing agent, and a pigment. The hydrophilic agent may be attached covalently to any of the coating additives mentioned herein. The hydrophilic agent may be an anti-freeze protein, an anti-freeze glycoprotein, a hydrophilin, a dehydrin, a polypeptide, a poly-saccharide, or a combination thereof.

The AFPs used in the coatings may be from a fish, a plant, an insect, a diatom, a bacteria, or a combination thereof. As mentioned before, AFPs from plants have multiple hydrophilic ice-binding domains and are attractive hydrophilic agents. Plants AFPs may be from, but are not limited to, winter rye, bittersweet nightshade, perennial ryegrass, Antarctic hair grass, Antarctic pearlwort and carrot.

In some embodiments, the hydrophilic agents may be plant hydrophilins and dehydrins, attached to the coating additives. The source of hydrophilins and dehydrins may be, but are not limited to, winter rye, carrot, perennial rye grass, wheat, cotton, Arabidopsis, moss, cowpea, soybean, maize, celery, tomato, barley, citrus, spinach and peach.

AFPs and hydrophilins may be obtained by isolating the endogenous protein from the source described herein. Any number of methods known in the art may be used to isolate the protein. For example, the hydrophilins from a plant extract may be purified by performing the following steps: centrifugation, ammonium sulfate precipitation, passing through an ion-exchange chromatography column, dialysis and lyophilization.

AFPs and hydrophilins may also be obtained through recombinant techniques known in the art. For example, the DNA encoding a hydrophilin can be cloned in a plasmid and the protein can be exogenously expressed in a microbial cell. The microbial cell may be a bacterium, a cyanobacterium, a filamentous fungus, or a yeast. It is possible to express complete protein or polypeptide, or partial ice-binding domains using these techniques. Thus, in some embodiments, the hydrophilic agent may be a portion of an anti-freeze protein, a complete anti-freeze protein, a portion of hydrophilin, a complete hydrophilin or combinations thereof. In some embodiments, the hydrophilic agent may be a non-protein substance, such as a mixture of β-mannopyranosyl-β-xylopyranose poly-saccharide and a fatty acid.

Paints and coatings contain one or more additives or components in their composition. These additives alter properties of the paint, such as shelf life, application and longevity, health and safety. Such additives may be added, for example, during the manufacture of the emulsion polymer or during the formulation of the paint itself. Additives include initiators, rheology modifiers, preservatives, coalescing agents, and the like. Initiators are a source of free radicals to initiate the polymerization process in which monomers polymerize to form the polymers. Coatings may contain a redox system initiator, such as ferrous salts and thiosulfate along with the persulfate salts, that promote polymerization at room temperature.

Thickeners and rheology modifiers may be also added to coatings to achieve the desired viscosity and flow properties. Thickeners function by forming multiple hydrogen bonds with the acrylic polymers, thereby causing chain entanglement, looping and/or swelling which results in volume restriction. Thickeners, such as cellulose derivatives including hydroxyethyl cellulose, methyl cellulose and carboxymethyl cellulose, may be used in the compositions. In some embodiments, the hydrophilic agents may be attached to the rheology modifiers.

One or more preservatives may be added in the coating compositions in low doses to protect against the growth of micro-organisms. Preservatives, such as methyl benzisothiazolinones, chloromethylisothiazolinones, barium metaborate and 1-(3-chloroallyl)-3,5,7-triaza-1-azoniaadamantane chloride, may be used.

Coalescing agents, such as ester alcohols, benzoate ethers, glycol ethers, glycol ether esters and n-methyl-2-pyrrolidone, may be added to the coating compositions. Coalescing agents are added to, for example, insure film formation under varying atmospheric conditions. They may be slow evaporating solvents with some solubility in the polymer phase. They may also act as a temporary plasticizer, allowing film formation at temperatures below the system's glass transition temperature. After film formation, the coalescing agents may slowly diffuse to the surface and evaporate, increasing the hardness and block resistance of the film. In some embodiments, the hydrophilic agents may be attached to the coalescing agents.

Coatings may further contain one or more of the following components or additives: solvents, pigments, plasticizers, surfactants and the like. Surfactants may be used, for example, to create the micelles for particle formation, as well as long-term particle stabilization and these provide stability through electrostatic and steric hindrance mechanisms. Both ionic and non-ionic surfactants may be used. Examples may include, but are not limited to, alkyl phenol ethoxylates, sodium lauryl sulfate, dodecylbenzenesulfonate, polyoxyethylene alkyl ethers, polyoxyethylene alkyl allyl ethers, ethylene glycols, polyoxyethylene, stearic acid and polyoxypropylene. In some embodiments, the hydrophilic agents may be attached to the surfactants.

One or more plasticizers may be added to the compositions to adjust the tensile properties of the paint film. Plasticizers may be, for example, a glucose-based derivative, a glycerine-based derivative, propylene glycol, ethylene glycol, phthalates and the like.

The paints according to the disclosure may further include hydrophilic agents attached to one or more pigments. The term "pigments" is intended to embrace, without limitation, pigmentary compounds employed as colorants, including white pigments, as well as ingredients commonly known in the art as "opacifying agents" and "fillers". Pigments may be any particulate organic or inorganic compound and may provide coatings the ability to obscure a background of contrasting color (hiding power).

In some embodiments, the hydrophilic agents, for example, may be attached covalently to a surfactant by a simple chemistry using a cross-linking agent. The hydrophilic agent may be mixed with a surfactant for about 10 minutes to about 4 hours, for about 10 minutes to about 2 hours, for about 10 minutes to about 1 hours, for about 10 minutes to about 30 minutes. Specific examples include about 10 minutes, about 30 minutes, about 1 hour, about 2 hours, about 4 hours, and ranges between any two of these values. This step of mixing may be performed at the temperature of about 20° C. to about 40° C., about 20° C. to about 35° C., about 20° C. to about 30° C., and about 20° C. to about 25° C. Specific examples include about 20° C., about 25° C., about 30° C., about 40° C., and ranges between any two of these values. Next, a cross-linking agent may be added to this hydrophilic agent-surfactant mixture and the mixing is further continued for about 1 hour to about 10 hours, for about 1 hour to about 6 hours, for about 1 hour to about 4 hours, and for about 1 hour to about 2 hours. Specific examples include about 1 hour, about 2 hours, about 4 hours, about 6 hours, about 8 hours, about 10 hours, and ranges between any two of these values. This step of the reaction may be performed at the temperature of about 20° C. to about 40° C., about 20° C. to about 35° C., about 20° C. to about 30° C., and about 20° C. to about 25° C. Specific examples include about 20° C., about 25° C., about 30° C., about 40° C., and ranges between any two of these values. At the end of the reaction, the mixture can be dialyzed to remove unreacted components and the hydrophilic agent-surfactant conjugate is purified by lyophilization, spin column, centrifugal filters or by other methods known in the art. The hydrophilic agent covalently linked to a surfactant may be added to a paint composition during any step of the paint preparation or before a consumer uses the paint.

The hydrophilic agents attached to paint additives or components may be dispersed in one or more organic binders, preferably a polymeric organic binder. In the broadest aspect, it is contemplated that any polymeric binder may be employed. In some embodiments, the polymeric binder is a water-dispersible polymer. The water-dispersible polymer may include a latex binder, such as natural latex, neoprene latex, nitrile latex, acrylic latex, vinyl acrylic latex, styrene acrylic latex, styrene butadiene latex, or the like. Compositions may include a single binder or a mixture of two or more polymeric binders that may be of the same class or different. For example, organic binders may be combined with a silicon-based binder.

In some embodiments, the hydrophilic agents attached to paint additives or components may be dispersed in inorganic binders. Inorganic binders may include, without limitation, alkali metal polysilicates, such as potassium polysilicate, sodium polysilicate, lithium polysilicate or the like.

The coating additive with hydrophilic agent may be present in a paint formulation from about 0.1 to about 10 weight percent, from about 0.1 to about 5 weight percent, from about 0.1 to about 2 weight percent, from about 0.1 to about 1 weight percent, or from about 0.1 to about 0.5 weight percent. Specific examples include about 0.1 weight percent, about 0.5 weight percent, about 1 weight percent, about 2 weight percent, about 5 weight percent, about 10 weight percent of the total weight, and ranges between any two of these values.

A coating of the present disclosure may generally be applied to any substrate. The substrate may be an article, an object, a vehicle or a structure. Although no particular limitation is imposed on the substrate to be used in the present disclosure, exterior of a building, hull of a boat or a ship, vehicles, bridges, airplanes, metal railings, fence, glasses, plastics, metals, ceramics, wood, stones, cement, fabric, paper, leather, and combinations or laminations thereof may be used. The coating may be applied to a substrate by spraying, dipping, rolling, brushing, or any combination thereof.

An exemplary coating embodiment is shown in FIG. 1. The coating with a hydrophilic agent attached to a surfactant is applied on an object. As the water evaporates, the binder particles pack against each other forming an irreversible networked structure. During this process, surfactant molecules attached to hydrophilic agents may migrate to the surface. The hydrophilic agents provide a hydrophilic surface to the coating, thus aiding in self-cleaning of the surface. Under low humidity conditions, the hydrophilins and dehydrin proteins may undergo conformational changes, thus exposing the hydrophilic residues on their outer surface. These surfaces are able to interact and retain water molecules for relatively longer periods of time, thus keeping the surface wet and helping water to sheath off and remove dirt.

EXAMPLES

Example 1

Recombinant Expression and Purification of Peach Dehydrin

The cDNA encoding for peach dehydrin polypeptide (606 base pairs) is cloned into the multiple cloning site of the bacterial expression vector pET6X using standard molecular biology techniques. An *E.coli* strain BL21(DE3)pLysis transformed with the above vector and the resulting transformants are grown in a 3 mL LB medium containing 50 micrograms/mL ampicillin, overnight at 37° C. Next day, the starter culture is inoculated into a 250 mL LB broth, and the bacteria is allowed to grow until the $OD_{600}$ reaches 0.5 or 0.6. The expression of peach dehydrin is induced by addition of 0.5 mM IPTG for 3 hours. At the end of this period, the bacteria is spun down by centrifugation (10,000 rpm for 15 minutes), and the bacterial pellet is suspended in a buffer containing 50 mM HEPES, 150 mM NaCl, 0.1% NP-40 and protease inhibitors. The suspended pellet is sonicated to lyse the bacteria, and the lysate is subjected to centrifugation (30,000 rpm for 45 minutes). The supernatant is collected and the histidine-tagged peach dehydrin is purified using a nickel affinity column purification kit.

Example 2

Preparation of Dehydrin-Surfactant Conjugates

Peach dehydrin protein is dissolved in PBS (10 mM sodium phosphate, pH 7.4, containing 150 mM NaCl) at a concentration of 0.5 milligrams/mL and mixed with stearic acid (1 picomole/mL in PBS) and incubated for 30 minutes at 37° C. The cross-linking agent EDC (1-ethyl-3-(3-dimethylaminopropyl) carbodiimide)) is added to a final concentration of 100 mM, and the reaction mixture is further incubated overnight at 37° C. with mild shaking. The reaction is stopped by dialysis against 50 mM $NH_4HCO_3$ for 4 hours, and the dialyzed protein conjugate is then lyophilized Example 3

Preparation of AFP-Surfactant Conjugates

Carrot AFP is dissolved in PBS (10 mM sodium phosphate, pH 7.4, containing 150 mM NaCl) at a concentration of 0.5 milligrams/mL and mixed with stearic acid (1 picomole/mL in PBS) and incubated for 30 minutes at 37° C. The cross-linking agent EDC (1-ethyl-3-(3-dimethylaminopropyl) carbodiimide)) is added to a final concentration of 100 mM, and the reaction mixture is further incubated overnight at 37° C. with mild shaking. The reaction is stopped by dialysis against 50 mM $NH_4HCO_3$ for 4 hours, and the dialyzed protein conjugate is then lyophilized Example 4

Preparation of a Hydrophilic Coating

A hydrophilic coating is prepared having the following components: 40 grams of chromium oxide pigment, 2 grams of peach dehydrin-stearic acid conjugate (Example 2), 2 grams of thickener (hydroxyethyl cellulose), 150 grams of solvent (water), 70 grams of binder (methyl methacrylate), 0.3 grams of coalescing agent (2,2,4-trimethyl-1,3-pentanediolmono (2-methylpropanoate)), and 0.05 grams of bactericide. The components are mixed under high shear for 30 minutes.

Example 5

Evaluation of Hydrophilic Property

The hydrophilic coating containing peach dehydrin-stearic acid conjugates of Example 2 is coated on a glass surface and dried at room temperature. The surface free energy and the water droplet contact angle of the hydrophilic coating is measured as follows. A Zisman plotting method is employed for measuring surface free energy. The surface tension of various concentrations of the aqueous solution of magnesium chloride is plotted along the X-axis, and the contact angle in terms of cos θ is plotted along the Y-axis. A graph with a linear relationship between the two is obtained. The graph is extrapolated such that the surface tension at contact angle 0° is measured and is defined as the surface free energy of the solid. The surface free energy of the glass surface measured will be 83 milliNewton/meter.

Example 6

An Object Coated with Hydrophilic Paint

A metal table is painted with a hydrophilic coating containing carrot anti-freeze protein conjugate (Example 3) and is allowed to dry at room temperature. The surface free energy of the chair is measured as explained in Example 5 and will be 84 milliNewton/meter. The anti-fouling property of the coating is measured as follows: A line is drawn on the coated table using oily ink A similar line is also drawn on a table which is not coated. A water jet is continuously applied on both the surfaces and periodically checked whether the oily line is erased. The oily ink applied on the coated table will be erased after 1 minute whereas the oily line on the un-coated table will be un-changed and visible.

Example 7

Anti-Freeze Properties

The coating with carrot AFP-surfactant conjugates (Example 3) is applied on a glass plate and placed in a chamber set at a temperature of 1° C. A plate with a similar coating, but without AFP-surfactant conjugates is placed alongside of the first plate. The surface of both the plates are moistened, and the development of frost or ice crystals are monitored over a period of time. The plate coated with AFP-surfactant conjugates will develop less frost when compared to the control plate.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A coating composition comprising:
   at least one hydrophilic agent comprising a hydrophilin from a plant, a yeast, a fungi, or a bacteria or a recombinant form thereof, and bound to one or more of the following coating components: a rheology modifier, a surfactant, a coalescing agent, and a pigment; and
   a binder component.

2. The composition of claim 1, wherein the at least one hydrophilic agent is covalently attached to the coating component.

3. The composition of claim 1, wherein the hydrophilic agent is a hydrophilin from one or more of the following plants: winter rye, carrot, perennial rye grass, wheat, cotton, *Arabidopsis*, moss, cowpea, soybean, maize, celery, tomato, barley, citrus, spinach or peach or a recombinant form thereof.

4. The composition of claim 1, wherein the at least one hydrophilic agent is a hydrophilin isolated from a plant or exogenously expressed in a microbial cell.

5. The composition of claim 4, wherein the microbial cell is a bacterium, a cyanobacterium, a filamentous fungus, or a yeast.

6. The composition of claim 1, wherein the hydrophilic agent is a hydrophilin from a peach covalently attached to a surfactant dodecylbenzenesulfonate.

7. The composition of claim 1, wherein the hydrophilic agent is a hydrophilin from a peach covalently attached to stearic acid.

8. The composition of claim 1, wherein the coating composition forms a hydrophilic, self-cleaning surface under low humidity conditions, when coated on a substrate.

9. A method of providing hydrophilic, self-cleaning surface to a substrate under low humidity conditions, the method comprising:
    applying a paint composition to the substrate, wherein the paint composition comprises at least one hydrophilic agent comprising a hydrophilin from a plant, a yeast, a fungi, or a bacteria or a recombinant form thereof, and bound to one or more of the following coating components: a rheology modifier, a surfactant, a coalescing agent, and a pigment.

10. The method of claim 9, wherein the at least one hydrophilic agent is covalently attached to the coating component.

11. The method of claim 9, wherein the at least one hydrophilic agent is a hydrophilin isolated from a plant or exogenously expressed in a microbial cell.

12. A method of providing ice-repellent properties to a substrate surface, the method comprising:
    applying a paint composition to the substrate, wherein the paint composition comprises at least one hydrophilic agent comprising a hydrophilin from a plant, a yeast, a fungi, or a bacteria or a recombinant form thereof, and bound to one or more of the following coating components: a rheology modifier, a surfactant, a coalescing agent, and a pigment.

13. The method of claim 12, wherein the at least one hydrophilic agent is covalently attached to the coating component.

14. The method of claim 12, wherein the at least one hydrophilic agent is a hydrophilin isolated from a plant or exogenously expressed in a microbial cell.

15. A method of preparing a hydrophilic paint composition, the method comprising:
    contacting a peach hydrophilin with a surfactant to form a mixture;
    purifying the mixture; and
    adding the mixture to a paint to form the hydrophilic paint composition.

16. The method of claim 15, wherein the surfactant is alkylphenolethoxylates, cetyl alcohols, alkanolamides, polyethylene glycol derivatives, trimethylalkylammonium chlorides, cetylpyridinium chloride, stearic acid or a combination thereof.

17. The method of claim 15, wherein contacting the peach hydrophilin with the surfactant comprises mixing the surfactant and the peach hydrophilin.

18. The method of claim 17, further comprising mixing the surfactant and the peach hydrophilin in the presence of a cross-linking agent.

19. The method of claim 15, wherein purifying the mixture comprises performing dialysis to remove an unreacted cross-linking agent and the surfactant.

20. The method of claim 19, further comprising freeze-drying the mixture.

21. The method of claim 15, wherein adding the mixture to the paint comprises adding the peach hydrophilin covalently linked to a surfactant to a paint composition at any step of the paint preparation.

22. A coating composition comprising:
    at least one hydrophilic agent comprising a mixture of β-mannopyranosyl-β-xylopyranose poly-saccharide and fatty acid bound to one or more of the following coating components: a rheology modifier, a surfactant, a coalescing agent, and a pigment.

23. The composition of claim 22, wherein the coating composition forms a hydrophilic, self-cleaning surface under low humidity conditions, when coated on a substrate.

* * * * *

UNITED STATES PATENT AND TRADEMARK OFFICE
CERTIFICATE OF CORRECTION

| | | |
|---|---|---|
| PATENT NO. | : 8,859,637 B2 | Page 1 of 2 |
| APPLICATION NO. | : 13/877413 | |
| DATED | : October 14, 2014 | |
| INVENTOR(S) | : Carlson et al. | |

It is certified that error appears in the above-identified patent and that said Letters Patent is hereby corrected as shown below:

On the Title Page, insert Figure 1 with the attached replacement drawing sheet.

In the Drawings

In the Figure, Sheet 1 of 1, replace the Figure with attached Replacement sheet.

In the Specification

In Column 2, Line 16, delete "FIGURES" and insert -- FIGURE --, therefor.

In Column 7, Line 26, delete "lyophilized" and insert -- lyophilized. --, therefor.

In Column 7, Line 41, delete "lyophilized" and insert -- lyophilized. --, therefor.

In Column 8, Line 19, delete "ink" and insert -- ink. --, therefor.

Signed and Sealed this
Twenty-second Day of September, 2015

Michelle K. Lee
*Director of the United States Patent and Trademark Office*